(12) United States Patent
Sellen et al.

(10) Patent No.: US 7,345,471 B2
(45) Date of Patent: Mar. 18, 2008

(54) DEVICE AND METHOD FOR DETECTING THE POSITION AND THE VELOCITY OF A TEST OBJECT

(75) Inventors: Martin Sellen, Ortenburg (DE); Felix Mednikov, Ortenburg (DE); Mark Nechaewskij, Samara (RU)

(73) Assignee: Micro-Epsilon Messtechnik GmbH & Co., Ortenburg (DE)

( * ) Notice: Subject to any disclaimer, the term of this patent is extended or adjusted under 35 U.S.C. 154(b) by 0 days.

(21) Appl. No.: 11/689,137

(22) Filed: Mar. 21, 2007

(65) Prior Publication Data

US 2007/0200558 A1 Aug. 30, 2007

Related U.S. Application Data

(63) Continuation of application No. PCT/DE2005/001274, filed on Jul. 19, 2005.

(30) Foreign Application Priority Data

Sep. 21, 2004 (DE) .................. 10 2004 046 031
Feb. 16, 2005 (DE) .................. 10 2005 007 265

(51) Int. Cl.
  *G01B 7/14* (2006.01)
  *G01R 33/05* (2006.01)
  *G01P 3/42* (2006.01)

(52) U.S. Cl. .................. 324/207.12; 324/207.24; 324/176

(58) Field of Classification Search ........... 324/207.12, 324/207.24, 176
See application file for complete search history.

(56) References Cited

U.S. PATENT DOCUMENTS 3,343,148 A 9/1967 Hannom
3,560,845 A 2/1971 Goldberg et al.
5,432,421 A 7/1995 Kessler et al.
6,356,075 B1 3/2002 Shank

FOREIGN PATENT DOCUMENTS

EP 0 478 813 A1 10/1990
GB 1 248 773 10/1971

OTHER PUBLICATIONS

The International Search Report for PCT/DE2005/001274, completed on Oct. 31, 2005.

*Primary Examiner*—Reena Aurora
(74) *Attorney, Agent, or Firm*—Alston & Bird LLP

(57) ABSTRACT

A device and method for detecting the position and velocity of a test object relative to a sensor, the sensor and the test object being arranged such that they can be displaced relative to one another. In one embodiment, the sensor has a measuring coil with one or more voltage tap(s) and has a target that is placed on the test object while being electromagnetically coupled to the measuring coil. An electronic component for adding the voltages tapped on the sensor is assigned to the sensor. The invention is, with regard to a simplest possible design of the sensor, characterized in that for simultaneously measuring position and velocity, the target comprises two parts, one part being made of an electrically conductive material and the other part being provided in the form of a magnet, and in that an evaluation circuit determines, based on the output signal of the electronic component for adding the tapped voltages, a voltage component $U_p$ that is proportional to the position of the target, and a voltage component $U_v$ that is proportional to the velocity of the target.

37 Claims, 3 Drawing Sheets

DEVICE AND METHOD FOR DETECTING THE POSITION AND THE VELOCITY OF A TEST OBJECT

CROSS REFERENCE TO RELATED APPLICATION

The present application is a continuation of international application PCT/DE 2005/001274, filed 19 Jul. 2005, and which designates the U.S. The disclosure of the referenced application is incorporated herein by reference.

BACKGROUND OF THE INVENTION

The present invention relates to a device and a method for detecting the position and velocity of a test object relative to a sensor, the sensor and the test object being arranged such that they can be displaced relative to one another, wherein the sensor has a measuring coil with at least one, or preferably a number of voltage tap(s) and has a target, which is placed on the test object while being electromagnetically coupled to the measuring coil and wherein an electronic component for adding the voltages tapped on the sensor is assigned to the sensor.

Measuring devices of the type mentioned above are required, for example, for determining the position of the piston on pneumatic and hydraulic cylinders and also for measuring valve positions, particularly in closed loop control circuits. It is advantageous for such applications if the position of the test object and its velocity of movement relative to the sensor can be measured simultaneously and absolutely.

Measuring devices for determining the position of a valve have been known for a long time. Thus, for example, the printed literature DE 198 56 528 A1 describes a valve lift sensor for determining the position of outlet valves and inlet valves, said sensor comprising two stator bodies spaced apart, which have circular recesses for a sensor plunger. A Hall sensor is arranged between the stator bodies and at a distance therefrom. The cylindrically designed sensor plunger is provided with a permanent magnet, which is displaced relative to the Hall sensor. The small dimension of the Hall sensor proves to be advantageous for this embodiment. However, only the position of the valve can be determined using this sensor.

In other displacement measuring sensors known from the prior art (for example, from the printed literature DE 25 11 683 C3 or DE 39 13 861 A1), a secondary winding is wound on an elongated magnetically soft sensor core and two primary windings are wound on the ends of the sensor core. A magnet displaced along the sensor core serves as the test object. By impinging current upon the primary winding, a voltage is induced in the secondary winding depending on the position of the magnet, which applies the magnetically soft sensor core in saturation to its immediate vicinity. The disadvantage here is the large dimensioning of the sensor. In addition, only the position can be determined here.

Furthermore, an eddy current sensor is known from DE 42 25 968 A1, in which a measuring coil is provided with a number of voltage taps. By means of a ring, which surrounds the measuring coil and is made of an electrically conductive material, the partial impedance of the measuring coil between two adjacent voltage taps is influenced depending on the position of the ring. With the help of an evaluation circuit, it is thus possible to determine the relative position of the ring in relation to the voltage taps. However, the only direct result of this method is the position.

A solenoid valve, particularly for inlet and outlet valves of internal combustion engines is described in the printed literature DE 197 35 375 C1. For regulating the application of current to the magnetic drive mechanism, the position of the valve armature is detected by means of a piezoelectric element measuring the force of the valve spring. From this it is possible to determine the respective position of the armature and thus the stroke course and the speed of the armature can be determined. What proves to be disadvantageous here is the strongly restricted structure of the sensor and the determination of the speed from the course of the armature position over time.

The crucial disadvantage of the methods known from practical experience for determining the velocity from the displacement signal by differentiating the signal is that disturbances particularly noise, greatly influence the output signal in differentiating systems in general. Thus there are a strongly increasing number of requirements made of the quality of the displacement signal, particularly in relation to linearity and the signal-to-noise ratio, thereby necessitating the use of expensive low-noise sensors.

In principle, two sensors can also be used, of which one detects the course of the position over time while the other sensor detects the velocity of the test object. However, in doing so, the space required and the costs of the sensor system increase considerably due to the sensors and the evaluation electronic systems required in each case. Furthermore, an additionally necessary synchronization of the two sensors has negative effects.

It is therefore an object of the present invention to specify a device and a method of the type mentioned in the introduction for detecting the position and velocity of a test object, in which method it is possible to measure both the position and the velocity using only one sensor simultaneously and without subsequent differentiation of the displacement signal as cost-effectively as possible, with long term stability and with the smallest possible dimensions of the device.

SUMMARY OF THE INVENTION

The above objectives and others are realized according to the invention by providing, in one embodiment, a device for detecting the position and velocity of a test object relative to a sensor, the sensor and the test object being arranged such that they can be displaced relative to one another, the device comprising a sensor comprising a measuring coil with one or more voltage taps, and a target that is placed on the test object while being electromagnetically coupled to the measuring coil and being connected to the test object, wherein the device simultaneously measures the position and the velocity, and wherein the target comprises two parts, one part made of an electrically conductive material and the other part provided in the form of a magnet, and wherein the magnet is designed as a permanent magnet, due to which the one part brings about a change in the impedance of the sensor, the change being dependent on the position of the target relative to the sensor, and the magnet induces a voltage in the sensor, the voltage being dependent on the velocity of the target relative to the sensor, and that an electronic component for adding the voltages tapped on the sensor is assigned to the sensor, wherein the output signal of the component contains information about the position and velocity of the test object relative to the sensor, the information resulting from the two-part design of the target.

Accordingly, a device of such type is characterized in that, for simultaneously measuring the position and the velocity, the target comprises two parts, one part being made of an electrically conductive material and the other part being provided in the form of a magnet.

The present invention also provides, in one embodiment, a method for detecting the position and the velocity of a test object relative to a sensor, the sensor and the test object being arranged such that they can be displaced relative to one another, the method comprising providing a sensor having a measuring coil with one or more voltage taps, providing a target that is placed on the test object while being electromagnetically coupled to the measuring coil, adding the voltages tapped on the sensor using an electronic component based on the output signal of the electronic component, and determined by means of an evaluation circuit a voltage component $U_p$ that is proportional to the position of the target and a voltage component $U_v$ that is proportional to the velocity of the target, wherein the voltage component $U_p$ is brought about by means of an electrically conductive part of the target, due to which part the impedance of the sensor is changed depending on the position of the target relative to the sensor, and the voltage component $U_v$ is brought about by another part of the target, which part comprises a magnet and induces a voltage in the sensor, said voltage being dependent on the velocity of the target relative to the sensor.

Accordingly, a method for detecting the position and the velocity of a test object is characterized in that for simultaneously measuring the position and the velocity, an evaluation circuit determines, based on the output signal of the electronic component for adding the tapped voltages, a voltage component that is proportional to the position of the target, and a voltage component that is proportional to the velocity of the target.

According to the present invention, it was realized at first that a device for determining the position and the velocity of a test object can be designed in a particularly effective and space-saving manner if both the position and the velocity are measured simultaneously using one sensor. According to the present invention, it was further realized that by means of a special design form of the target of an eddy current sensor, it is possible to generate a signal which contains both a position-dependent and a velocity-dependent component and that these components can be derived from the sensor signal by means of a simple evaluation circuit.

A target (e.g., transducer) is placed on the test object, while being electromagnetically coupled to the measuring coil, wherein the target is formed of two parts according to the present invention, one part being made of an electrically conductive material and the other part consisting of a magnet. According to the present invention, in this device advantage is taken of the fact that the relative movement between the magnet and the measuring coil results in an induction voltage $U_v$, which is used as a measure of the velocity of movement. Simultaneously, a voltage signal $U_p$ resulting from the impedance change of the measuring coil, said impedance change being brought about by the electrically conductive part of the target, is used as a measure of the target position.

In a preferred design form of the device according to the present invention, the length of the entire target does not exceed the distance between two adjacent voltage taps of the measuring coil and is preferably approximately equal to this distance. An optimal ratio of measuring area to the length of the measuring coil and a maximum linearity of the output signals are thus achieved.

The measuring coil is preferably impinged upon with high-frequency ac voltage (approx. 20 kHz to 500 kHz), the exact selection of frequency depending on the required frequency of movement of the test object. Due to the simple design of the oscillator with stable frequency and amplitude, a symmetrical supply of the measuring coil with two complementary ac voltages, preferably bipolar square-wave voltages, is very advantageous. The voltages tapped on the measuring coil are added up with the help of an adding component. The output signal thereof represents an additive superimposition of the voltages $U_v$ and $U_p$.

The evaluation of the output signal is carried out preferably by means of an evaluation circuit, designed as an analog or preferably digital circuit. A digital evaluation circuit essentially consists of an analog/digital converter and a microcontroller. The ac voltage for the supply to the measuring coil can be generated in a particularly advantageous manner using this microcontroller.

In a particularly advantageous design form of the target, the latter is formed of a non-ferromagnetic material, such as e.g., aluminum or copper alloys and has a wall thickness that is greater than the penetration depth of the eddy current at the appropriately selected frequency. It is thus possible to ensure that the influence of the electrical conductivity of the magnet on the voltage $U_p$ is as low as possible.

Furthermore, it is advantageous if the magnet comprises a permanent magnet, is designed essentially in a bar-shaped or ring-shaped manner, and is magnetized preferably in the longitudinal direction. In doing so, both the magnetic permeability $\mu_m$ of the magnet (e.g., $\mu_m<3$) and the ratio of the diameter of the magnet to the length of the measuring coil (e.g., <10) should be as small as possible and the inner diameter of the measuring coil should not greatly exceed the diameter of the bar magnet. This helps achieve maximum sensitivity and a high stability of the signal $U_v$ along the measuring coil.

As for the arrangement of the target and the measuring coil, various advantageous embodiments are feasible. In a first embodiment, the target is displaced within and along the measuring coil, wherein the ring-shaped electrically conductive part of the target surrounds a bar-shaped magnet. In another arrangement, the target surrounds the measuring coil, wherein the permanent magnet is likewise designed in a ring-shaped manner and surrounds the electrically conductive material on its part. An electrically conductive core within the measuring coil provides another possibility with the result that the position signal $U_p$ can be tapped directly from this core and the velocity signal $U_v$ can be tapped from the center of the measuring coil.

The method according to the present invention is used preferably for operating these devices. Here, the measuring coil is impinged upon with two ac voltages $U_1$ and $U_2$, which are preferably complementary to one another. With a view to achieving a particularly simple evaluation of the sensor signals, the ac voltages used are (preferably bipolar) square-wave voltages. The output signal is sampled at two predetermined points in time $t_1$ and $t_2$ within a period of the output signal of the electronic component for adding the tapped voltages. The points in time $t_1$ and $t_2$ are selected such that the output signal at the first sampling instance is located in the upper half wave (H) and the output signal at the second sampling instance is located in the lower half wave (L) and possible transient phenomena are decayed in both the cases. The difference between the sampled values [H−L] is a measure of the position of the target. The expression [0.5× (H+L)−$U_{ref}$] provides a measure of the velocity of the target. For increasing the resolution and precision, the sampling of the output signal and the evaluation thereof are repeated preferably periodically and an average is taken of the measurement results of each case.

What proves to be particularly advantageous in the device and method according to the present invention is the extensive compensation of the long-term offset drift due to aging and temperature influences, said compensation being brought about by taking the difference.

The preceding embodiments of a device and a method for detecting the position and velocity of a test object relative to a sensor are not restricted to the translatory systems described so far. Rather they hold true similarly for rotary systems. There they enable the simultaneous measurement of the angular position and the rotational speed.

BRIEF DESCRIPTION OF THE DRAWINGS

Figure 1:
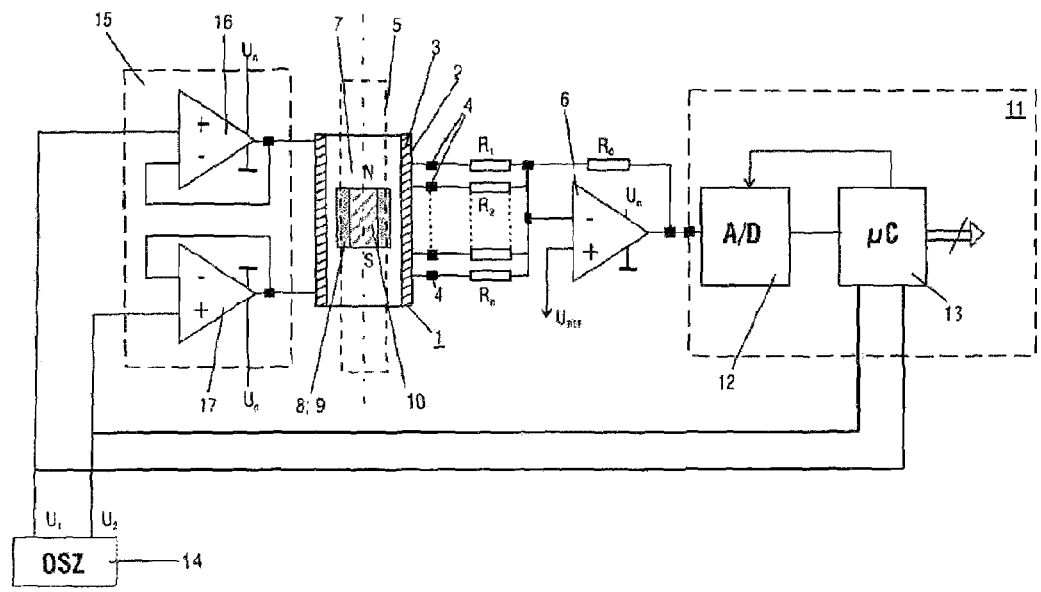
Figure 2:
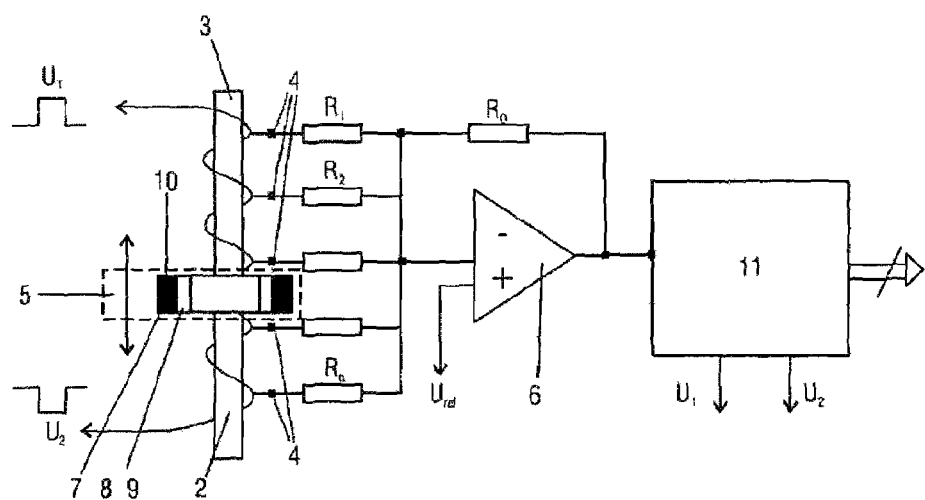
Figure 3:
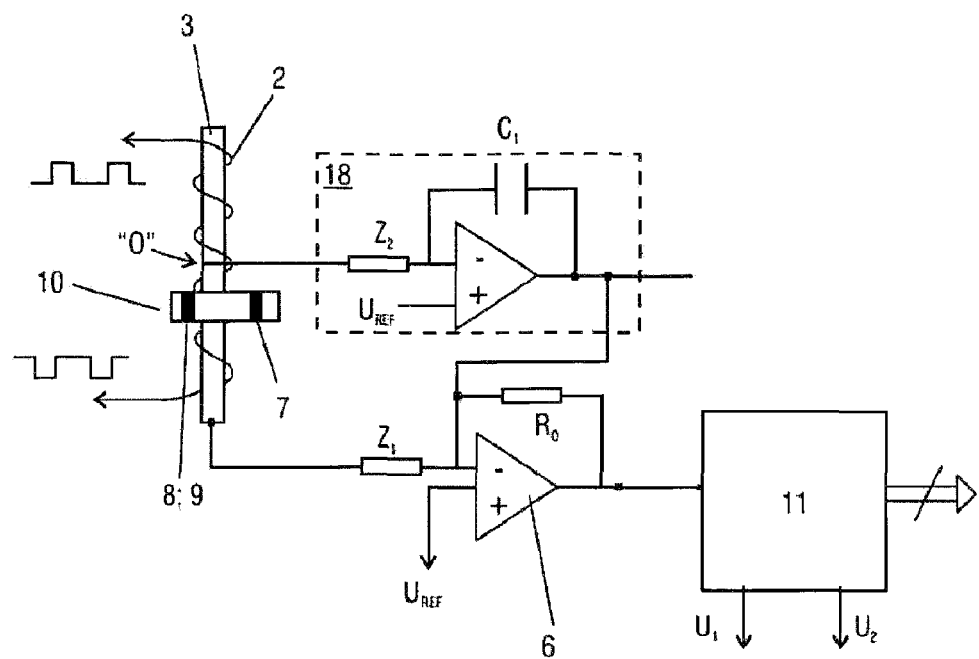
Figure 4:
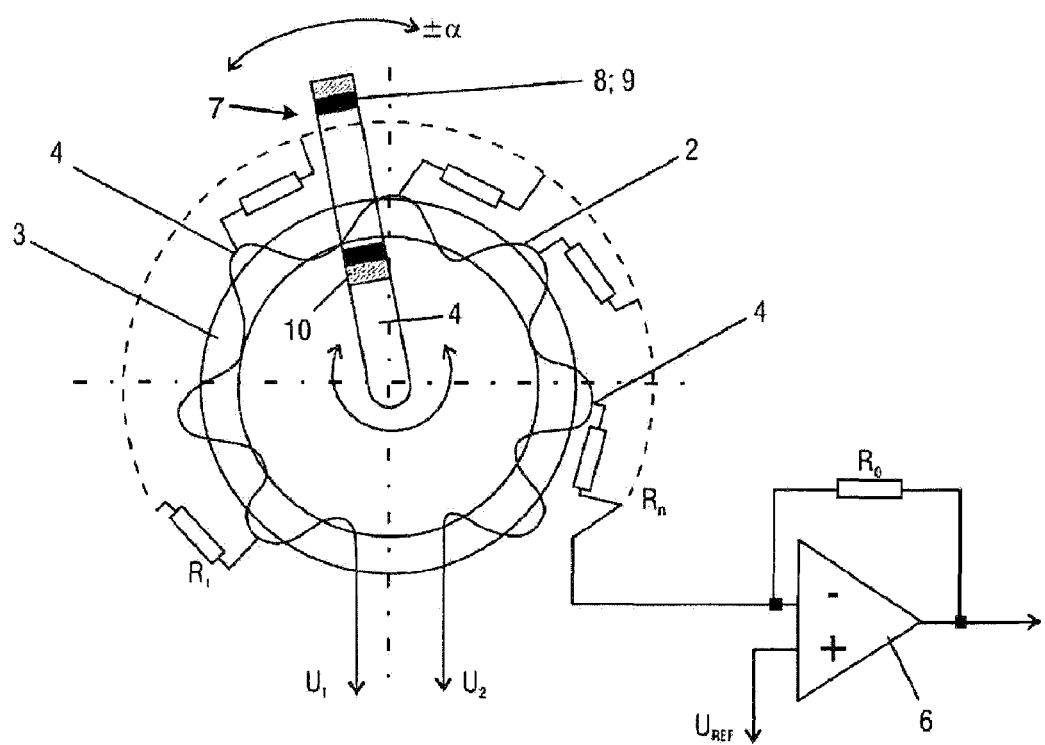
Figure 5:
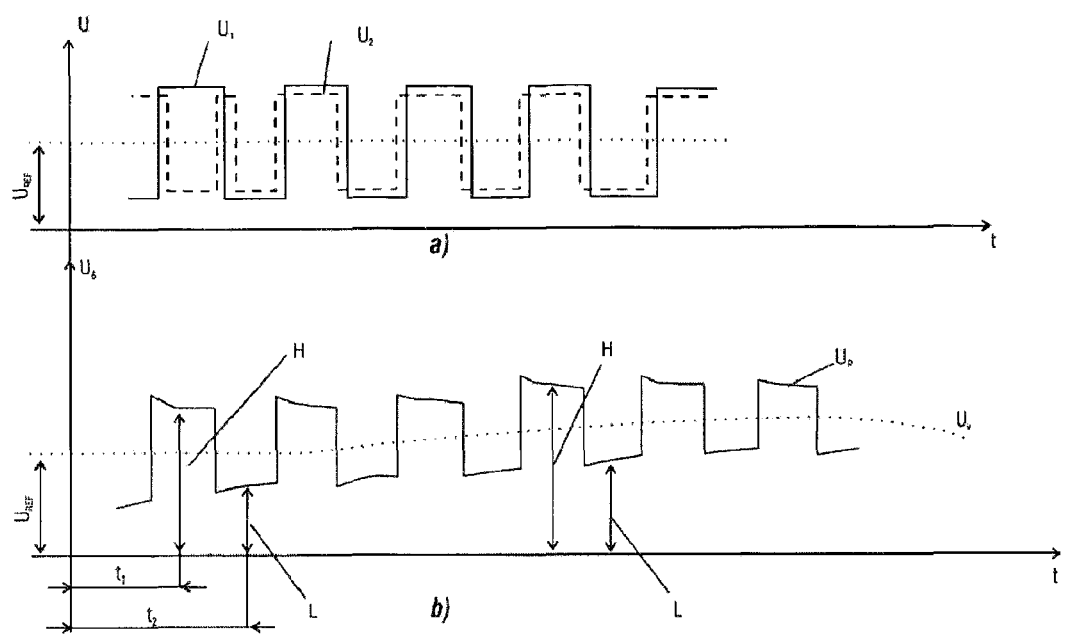

Having thus described the invention in general terms, reference will now be made to the accompanying drawings, which are not necessarily drawn to scale, and wherein:

FIG. 1 shows a schematic drawing of a device according to the present invention in the form of a block diagram;

FIG. 2 shows another embodiment of such a device with a target that surrounds the measuring coil;

FIG. 3 shows a third embodiment, in which the position signal is collected directly on the core;

FIG. 4 shows a schematic illustration of a device for determining angular and rotational speed; and FIG. 5 shows the typical course of the sensor output signal.

DETAILED DESCRIPTION OF THE INVENTION

The present invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

In a first exemplary embodiment of a device (FIG. 1) according to the present invention, a sensor 1 is provided which comprises a measuring coil 2 which is wound on a coil body 3 and has a number of taps 4. In the interior of the coil body 3, a test object 5 is displaced together with a target 7, which is electromagnetically coupled to the measuring coil 2, along the longitudinal axis of the measuring coil 2. The target 7 is composed of two parts, the first part facing the coil being produced in the form of a ring 9 from an electrically conductive material and surrounding the second part, which is a permanent magnet 10. The length of the target 7 does not exceed the distance between two adjacent taps 4. This helps achieve simultaneously the maximum linearity and the optimal ratio of the measuring area to the length of the measuring coil 2. Furthermore, the ring 9 is made of aluminum or a copper alloy, its wall thickness being greater than the penetration depth of the eddy current. The permanent magnet 10 is designed as a bar magnet and is magnetized in the longitudinal direction (e.g., direction of movement).

The measuring coil 2 is supplied using the driver 15 (operational amplifier OP16 and OP17) with two complementary bipolar square-wave voltages $U_1$ and $U_2$, which are generated by an oscillator 14 and whose frequency lies preferably in the range of 20 kHz to 500 kHz depending on the frequency of movement of the target.

The ac voltages applied at the taps 4 are added up with the help of an operational amplifier OP6 and a resistor network $R0, R1, \ldots, R_n$. In the case of a displacement of the target 7 relative to the measuring coil 2, an ac voltage is adjusted at the output of OP6, which ac voltage can be regarded as the sum of a transformatory and a dynamic voltage. The transformatory component is proportional to the position and the dynamic component is proportional to the velocity of the target 7.

For evaluating the two signal components, an evaluation circuit 11 is provided, whose input is connected to the output of the summation amplifier 6. This evaluation circuit 11 comprises an A/D converter 12 and a microcontroller 13, which controls the A/D converter and can be used simultaneously for generating the ac voltages $U_1$ and $U_2$.

The device shown in FIG. 2 differs from the exemplary embodiment explained previously in that the test object with the target 7 is displaced outside the measuring coil 2. Here also, the target 7 consists of two parts, wherein the permanent magnet 10 is designed as a toric magnet and it surrounds the electrically conductive ring 9. The measuring coil 2 with its taps 4 is wound on a coil body 3 made of a magnetically soft material and is supplied with two complementary bipolar square-wave voltages $U_1$ and $U_2$, which in turn can be generated directly by the evaluation circuit 11 similarly to the previously described exemplary embodiment.

The third exemplary embodiment of the device according to the present invention is shown in FIG. 3. The measuring coil 2, which is single-layered in this case, is wound on a coil body 3. From this coil body 3 a signal is tapped directly and amplified with the OP6. Simultaneously, the output voltage of an integrator 18 is applied at the inverting input of the OP6, the input of the integrator being connected to the center tap "0" of the measuring coil 2.

In this embodiment, there are two variants when evaluating the signal. In the first variant, the time constant of the integrator 18 is selected such that the high-frequency component of the signal at tap 4 is filtered out and thus the velocity signal is present at the output of the integrator 18. Simultaneously, a signal that is proportional to the position of the target 7 is generated at the output of the OP6. In the second variant, the voltage at the output of the integrator 18 is added up with the ac voltage tapped on the coil body 3 and the additional evaluation is carried out in a separate evaluation circuit 11 as has been described already in connection with the previously mentioned exemplary embodiments.

A device for measuring rotary motions is introduced in FIG. 4. A single-layered measuring coil 2 is wound on a ring-shaped coil body 3 made of a magnetically soft material and comprises n taps with the resistors $R_1, \ldots, Rn$, which can be integrated directly with the measuring coil. The target 7, which is likewise provided with a two-part design, surrounds the measuring coil 2. The measuring coil 2 is in turn supplied with two complementary bipolar square-wave voltages $U_1$ and $U_2$. Here also an ac voltage having two components is generated at the output of OP6, which ac voltage contains both information about the rotation angle and about the rotational speed. The evaluation of the sensor signal is carried out again using the evaluation circuit 11 described previously.

In the following, a method for simultaneously detecting the position and velocity of a test object 5 relative to the sensor 1 is introduced with the help of FIG. 5 for the different previously described exemplary embodiments of the device according to the present invention. For this purpose, the measuring coil 2 is supplied with two complementary square-wave voltages $U_1$ and $U_2$ as can be seen in FIG. 5a. Here, $U_{ref}$ is a stable constant voltage and the two voltages $U_1$ and $U_2$ are displaced towards positive voltages by the amount of said constant voltage $U_{ref}$. The amount is selected such that it reaches approximately half the supply voltage $U_n$ of the operational amplifiers (OP6, OP16 and OP17). For example, if $U_n$ is +5V, then a $U_{ref}$ of +2.5V is selected.

FIG. 5b shows a typical signal waveform at the output of the OP6. This signal represents a superimposition of the voltages $U_p$ that is proportional to the position and $U_V$ that is proportional to the velocity and $U_{ref}$. The output signal is sampled at the sampling instances $t_1$ and $t_2$ within a period of the output voltage of the summing amplifier 6, the sampling instances $t_1$ and $t_2$ being selected such that the sampling is performed once during the upper half wave H and once during the lower half wave L of the output signal. Possible transient phenomena are already decayed at both the sampling instances. The difference [H−L] is then a measure of the position of the target and the expression $[0.5 \times (H+L) - U_{ref}]$ is a measure of the velocity thereof.

The calculations can be carried out with the help of a microcontroller 13, which also determines the sampling instances $t_1$ and $t_2$, controls the A/D converter 12 and generates the square-wave voltages $U_1$ and $U_2$ in certain circumstances.

For increasing the resolution and precision, the sampling and evaluation of the output signal are repeated periodically and an average is taken of a predetermined number of results.

As for the other advantageous design forms and refinements of the device according to the present invention for detecting the position and velocity of a test object relative to the sensor, the general part of the description and the appended claims are herewith incorporated by reference for the purpose of avoiding repetitions.

Finally, it should be pointed out expressly that the exemplary embodiments described above explain only the teaching claimed without restricting said teaching to these exemplary embodiments.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A device for detecting a position and velocity of a test object relative to a sensor, the sensor and the test object being arranged such that they can be displaced relative to one another, said device comprising:
   a sensor comprising a measuring coil with one or more voltage taps;
   a target that is placed on the test object while being electromagnetically coupled to the measuring coil and being connected to the test object,
   wherein the device simultaneously measures the position and the velocity, and wherein the target comprises two parts, one part made of an electrically conductive material and the other part provided as a magnet, and wherein the magnet is designed as a permanent magnet, due to which the one part brings about a change in the impedance of the sensor, said change being dependent on the position of the target relative to the sensor, and the magnet induces a voltage in the sensor, said voltage being dependent on the velocity of the target relative to the sensor, and that an electronic component for adding the voltages tapped on the sensor is assigned to the sensor, wherein an output signal of the component contains information about the position and velocity of the test object relative to the sensor, said information resulting from the two-part design of the target.

2. The device according to claim 1, wherein the measuring coil is designed to be a single-layered measuring coil.

3. The device according to claim 1, wherein the measuring coil is designed to be a multi-layered measuring coil.

4. The device according to claim 1, wherein the measuring coil has a plurality of voltage taps, and wherein said voltage taps have essentially the same distance from one another.

5. The device according to claim 1, wherein a length of the target does not exceed a distance between two adjacent voltage taps of the measuring coil.

6. The device according to claim 1, wherein a length of the target is approximately equal to a distance between two adjacent voltage taps.

7. The device according to claim 1, wherein the target is displaceable in an interior of the measuring coil.

8. The device according to claim 1, wherein the target is displaceable outside the measuring coil.

9. The device according to claim 8, wherein the target surrounds the measuring coil.

10. The device according to claim 1, wherein the one part of the target is made of a non-ferromagnetic material.

11. The device according to claim 1, wherein the one part of the target is produced from aluminum or copper alloys.

12. The device according to claim 1, wherein a wall thickness of the one part of the target is greater than a penetration depth of the eddy current.

13. The device according to claim 1, wherein the one part of the target is designed as a ring.

14. The device according to claim 1, wherein the magnet is designed as a bar magnet.

15. The device according to claim 14, wherein the magnet is magnetized in the longitudinal direction.

16. The device according to claim 1, wherein the magnet is designed as a toric magnet.

17. The device according to claim 16, wherein the magnet is magnetized in the longitudinal direction.

18. The device according to claim 1, wherein a ring surrounds the magnet.

19. The device according to claim 1, wherein the magnet surrounds the ring.

20. The device according to claim 1, wherein the measuring coil is supplied with two ac voltages.

21. The device according to claim 20, wherein the two ac voltages are complementary to one another.

22. The device according to claim 20, wherein the two ac voltages are square-wave voltages.

23. The device according to claim 22, wherein the square-wave voltages are bipolar.

24. The device according to claim 20, wherein the two ac voltages are high-frequency voltages.

25. The device according to claim 1, wherein the voltages at the voltage taps of the measuring coil are supplied to the electronic component for adding the voltages tapped on the sensor.

26. The device according to claim 1, wherein the electronic component for adding the tapped voltages comprises a summation operational amplifier.

27. The device according to claim 1, wherein an evaluation circuit for evaluating the measurement signal is provided at the output of the electronic component.

28. The device according to claim 1, wherein a voltage tap at the center of the measuring coil is connected to an integrator.

29. The device according to claim 28, wherein a time constant of the integrator is selected such that high-frequency components of a signal taken at the voltage tap are filtered out and a voltage that is proportional to the velocity is present at the output of the integrator.

30. The Device according to claim 28, wherein an output of the integrator together with a voltage tap at a coil body is supplied to the electronic component for adding the voltages tapped on the sensor.

31. A method for detecting a position and velocity of a test object relative to a sensor, the sensor and the test object being arranged such that they can be displaced relative to one another, said method comprising: providing a sensor having a measuring coil with one or more voltage taps; providing a target that is placed on the test object while being electromagnetically coupled to the measuring coil; adding the voltages tapped on the sensor using an electronic component based on an output signal of an electronic component; and determined by means of an evaluation circuit a voltage component $U_p$ that is proportional to the position of the target and a voltage component $U_v$ that is proportional to the velocity of the target, wherein the voltage component $U_p$ is brought about by means of an electrically conductive part of the target, due to which part the impedance of the sensor is changed depending on the position of the target relative to the sensor, and the voltage component $U_v$ is brought about by another part of the target, which part comprises a magnet and induces a voltage in the sensor, said voltage being dependent on the velocity of the target relative to the sensor.

32. The method according to claim 31, wherein the measuring coil is impinged upon with two complementary bipolar square-wave voltages.

33. The method according to claim 31, wherein the output signal of the electronic component is sampled at two predetermined sampling instances, wherein one sampling instance lies in a range of an upper half wave of the output signal and the other sampling instance lies in a range of a lower half wave of the output signal.

34. The method according to claim 31, wherein a conclusion can be drawn about the position of the target or of the test object from the difference between a signal value sampled during an upper half wave of the output signal and a signal value sampled during a lower half wave of the output signal.

35. The method according to the claim 31, wherein the velocity of the target or of the test object is determined using the formula $0.5 \times (H+L) - U_{ref}$, wherein $U_{ref}$ is a stable direct-current voltage as a reference voltage for the electronic component for adding the tapped voltages, H is a signal value measured during an upper half wave of the output signal, and L is a signal value measured during a lower half wave of the output signal.

36. The method according to claim 31, wherein a sampling of the output signal of the electronic component and an evaluation of sampled signal values measured during an upper half wave of the output signal and during a lower half wave of the output sign are repeated periodically.

37. The method according to claim 36, wherein an average is taken of several measurement values for the position or the velocity.

* * * * *